(12) United States Patent
Krietzman et al.

(10) Patent No.: US 8,810,057 B2
(45) Date of Patent: Aug. 19, 2014

(54) WIND ENERGY SYSTEMS AND METHODS OF USE

(75) Inventors: Mark H. Krietzman, Palos Verdes, CA (US); Peter J. Gluck, Mission Viejo, CA (US); William A. Farone, Irvine, CA (US); Yung Chow, Irvine, CA (US)

(73) Assignee: AeroDynEnergy, Inc., Anaheim, CA (US)

( * ) Notice: Subject to any disclaimer, the term of this patent is extended or adjusted under 35 U.S.C. 154(b) by 886 days.

(21) Appl. No.: 12/768,657

(22) Filed: Apr. 27, 2010

(65) Prior Publication Data

US 2010/0270800 A1 Oct. 28, 2010

Related U.S. Application Data

(60) Provisional application No. 61/214,695, filed on Apr. 27, 2009.

(51) Int. Cl.
*F03D 9/00* (2006.01)

(52) U.S. Cl.
USPC .......................................................... 290/55

(58) Field of Classification Search
USPC .................................................. 290/44, 55
See application file for complete search history.

(56) References Cited

U.S. PATENT DOCUMENTS

| | | | |
|---|---|---|---|
| 2,177,801 A | 10/1939 | Erren | |
| 3,970,409 A | 7/1976 | Luchuk | |
| 4,342,539 A | 8/1982 | Potter | |
| 4,616,974 A | 10/1986 | Andruszkiw et al. | |
| 4,890,976 A | 1/1990 | Jansson | |
| 5,852,331 A | 12/1998 | Giorgini | |
| 5,982,046 A * | 11/1999 | Minh | 290/55 |
| 6,555,931 B2 * | 4/2003 | Mizzi | 290/54 |
| 6,946,751 B2 * | 9/2005 | Yoshida et al. | 290/44 |
| 6,979,170 B2 | 12/2005 | Dery et al. | |
| 7,040,859 B2 | 5/2006 | Kane | |
| 7,045,702 B2 | 5/2006 | Kashyap | |
| 7,078,825 B2 * | 7/2006 | Ebrahim et al. | 290/52 |
| 7,276,808 B2 | 10/2007 | Weitkamp et al. | |
| 7,365,447 B2 | 4/2008 | Yoshida | |
| 7,419,366 B2 * | 9/2008 | Doleh et al. | 417/333 |
| 7,442,009 B2 | 10/2008 | Arel | |
| 7,484,363 B2 | 2/2009 | Reidy et al. | |
| 7,605,489 B1 * | 10/2009 | Blank et al. | 290/44 |
| 7,884,492 B2 * | 2/2011 | Xiong et al. | 290/55 |
| 8,129,852 B2 * | 3/2012 | Edwards et al. | 290/44 |
| 8,143,740 B1 * | 3/2012 | Simnacher | 290/55 |
| 8,207,623 B2 * | 6/2012 | Rivas et al. | 290/44 |
| 2006/0188364 A1 | 8/2006 | Fritz | |
| 2008/0284171 A1 * | 11/2008 | Cory | 290/44 |

OTHER PUBLICATIONS

Tyler G. Hicks, "Standard Handbook of Engineering Calculations", Second Edition, pp. 3.494 to 3.500, McGraw-Hill, 1985.

* cited by examiner

*Primary Examiner* — Truc Nguyen
(74) *Attorney, Agent, or Firm* — Klein, O'Neill & Singh, LLP

(57) ABSTRACT

A system for generating electrical power from wind energy includes a wind turbine; a generator configured to generate electrical energy in response to the rotation of the wind turbine; an inertial storage device configured to receive electrical energy from the generator and to store it as kinetic energy; and a continuously-variable transmission configured to be selectively coupled between the wind turbine and the generator, and between the wind turbine and the inertial storage device.

21 Claims, 10 Drawing Sheets

WIND ENERGY SYSTEMS AND METHODS OF USE

This application claims the benefit and priority of U.S. Provisional Patent Ser. No. 61/214,695, filed Apr. 27, 2009, which is herein fully incorporated by reference for all purposes.

BACKGROUND

1. Field of the Disclosure

This disclosure relates to systems and methods for harnessing wind energy, and more specifically to wind turbines for producing electricity from wind energy.

2. Related Art

Although many technological advances have been made in the development of wind power generation systems, such as windmills and wind turbines, the variation of air currents impinging on such systems continues to cause substantial change in the angular velocity of the drive shafts associated with such systems. The lack of a stable angular velocity on the draft shaft does not allow for the maximum use of the mechanical energy that would otherwise be available for conversion into electrical energy.

Generally, rotor attributes for wind turbines are selected so as to maximize energy production. Since the power being produced is proportional to the swept area of the blades of the rotor, rotors are typically selected having longer blades to increase the swept area, which in turn produces more power.

However, at high wind speeds, a wind turbine having long blades experiences greater loads on the wind turbine components. For example, a wind turbine exposed to the additional wind energy created by excessively high-speed winds, may experience enough torque on the mechanical transmission system to damage, for example, the bearings and gears. Even in moderate wind speed environments, periodic wind gusts, which change both the speed and direction of the wind, apply forces that may be strong enough to damage equipment.

As the use of wind turbines continues to present an environmentally-friendly solution to help reduce the need for burning fossil fuels to generate electricity, what is needed is a wind turbine system that overcomes the aforementioned drawbacks and provides increased power and decreased damage to components.

SUMMARY

In one aspect of the present disclosure, a wind power system is provided including a wind turbine mounted on a tower support structure. The tower support structure includes an enclosure. The wind power system also includes a continuous variable transmission (CVT) coupled between the wind turbine and a first generator. An inertial storage device is positioned in the enclosure that is configured to receive energy from the first generator to cause the inertial storage device to accelerate or decelerate.

In another aspect, a wind power system is provided including a wind turbine mounted on a tower support structure. The tower support structure includes an enclosure. The wind power system also includes a continuous variable transmission (CVT) coupled between the wind turbine and a first generator, where the first generator provides electrical energy to at least one activator motor. An inertial storage device is positioned in the enclosed space, and is coupled to a second generator. The at least one activator motor is configured to store electrical energy in the inertial storage device as kinetic energy, and the second generator is configured to convert the kinetic energy stored in the inertial storage device into electrical energy.

In yet another aspect, a wind power system is provided, which includes a wind turbine affixed to a support tower mounted or constructed upon a support structure. The wind power system also includes a wind deflector, which is moveable relative to a direction of air flow and configured to control the movement of at least a portion of the air flow passing through rotor blades of the wind turbine to reduce wind loads on the components of the wind turbine while maintaining the air flow in an operating power production range.

In yet another aspect, a method is provided for providing structural support for a wind turbine affixed to a support tower mounted or constructed upon a support structure. The method includes deploying a wind deflector adjacent to the wind turbine; and moving the wind deflector relative to a direction of air flow to control the movement of at least a portion of the air flow passing through rotor blades of the wind turbine to reduce wind loads on the components of the wind turbine while maintaining the air flow in an operating power production range.

Other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure. The advantages of the present disclosure may be realized and attained by means of the instrumentalities and combinations particularly pointed out in the disclosure and any appended claims.

Figure 1A:
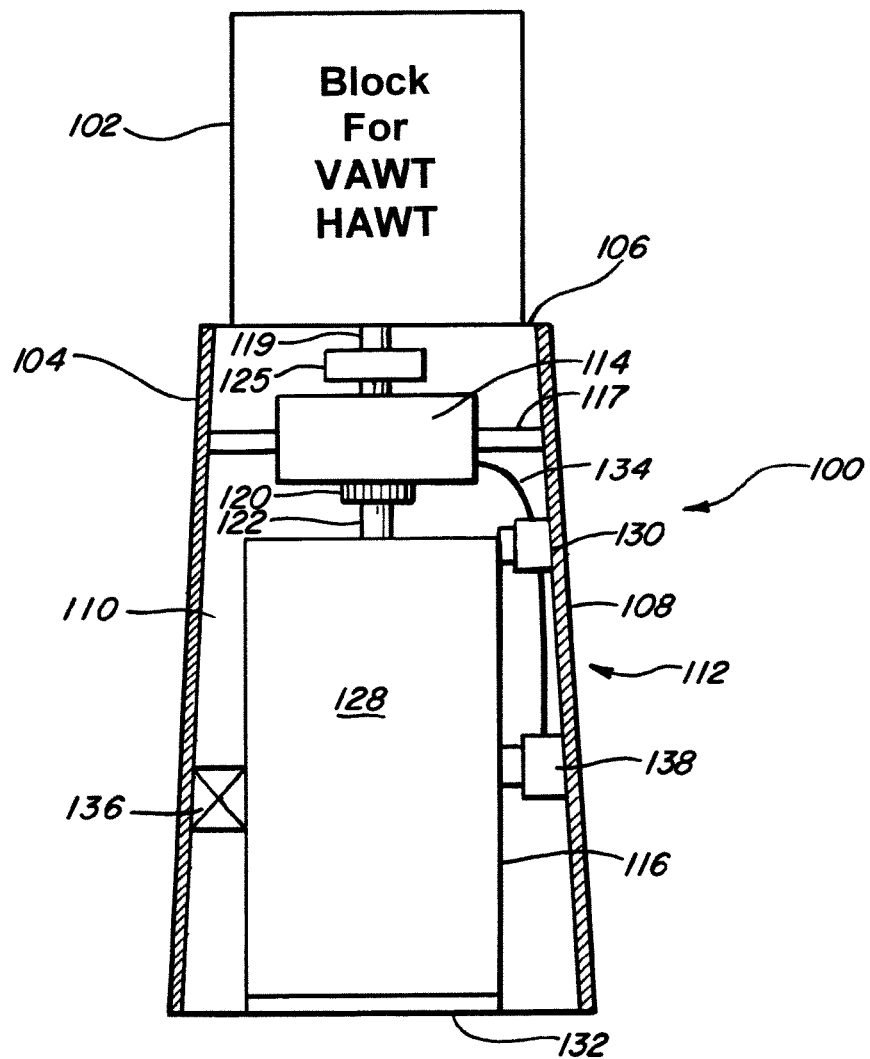
FIG. 1A is a simplified cut-away view of an exemplary implementation of a wind power system.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DESCRIPTION

A wind-energy conversion system includes at least three primary subsystems, an aerodynamic system (e.g. rotor blades and the like), the mechanical transmission system (e.g. gears, bearings and the like) and the electrical generating system. The physical configuration of the wind-energy conversion system produces an asymmetric force in the naturally occurring air currents or "wind" to control the air movement. The controlled air movements cause the physical configuration, including but not limited to, flow directing structures and collectors, to rotate, oscillate or translate, thus providing a mechanical energy from which electrical power may be generated. In some instances, a physical condition may be created, such as a pressure or temperature gradient, to control the air movement and create the motion that provides the mechanical energy. If the mechanical energy is used directly by machinery, for example, to pump water, cut lumber or grind stones, the machinery is generally referred to as a windmill. If the mechanical energy is instead converted to electricity, the machinery is generally referred to as a wind generator or wind turbine.

Wind turbines, are generally classified into two groups based upon the orientation of the turbine axis of rotation: 1) horizontal axis wind turbines ("HAWT") and 2) vertical axis wind turbines ("VAWT"). The conventional HAWT used for power generation generally has up to five blades arranged like a propeller, mounted to a horizontal rotor or drive shaft attached to a gearbox that drives a power generator. The HAWT may be mounted on a supporting tower that maintains the HAWT a significant distance above the ground for safety purposes and to minimize ground effects on wind flow. The gearbox is commonly used to step up the speed to drive the power generator, although some designs may directly drive an annular electric generator. Some turbines operate at a constant speed; however, more energy may be collected by using a variable speed turbine and a solid-state power converter to interface the turbine with the generator. In the figures, BLOCK FOR HAWT refers to a component that is a horizontal axis wind turbine having one or more blades that are responsive to air pressure or air movement, and that rotate about a horizontal axis.

The conventional VAWT has blades mounted to a vertically extending rotor or drive shaft and are generally used in areas where winds constantly shift direction because the blades are not required to be rotated to face into the wind. The VAWT typically functions in areas having low winds, since it requires a slower wind speed to start generating electricity. In the figures, BLOCK FOR VAWT refers to a component that is a vertical axis wind turbine having one or more blades responsive to air pressure or air movement, and that rotate around a vertical axis.

The following terms are generally understood by persons of ordinary skill in the wind power generation arts to have an ordinary meaning, which may include, or may be complemented by the meaning stated below.

A Wind Metric refers to a mapping or measure of the ambient wind flow at a location or in a region. The metric is a measurement of a variable used to document and forecast the potential or actual wind energy associated with a location per that metric measure. Such information may be used to in determining placement of high-density wind turbines and determining support configuration and strength requirements to match the wind mapping of the area. Metrics may include but are not limited to measuring the variables over a determined or known time/date period of total amount of wind at a particular height, total amount of wind per direction, wind per direction, wind per height, wind speed overall (all directions—an average), wind speed per direction, wind speed per height, wind acceleration (all directions—an average) wind acceleration per direction, wind acceleration per height, wind duration (overall—an average), wind duration per direction, wind direction per height wind gusts (overall), wind gusts per direction, wind gusts per height, wind turbulence (overall), wind turbulence per direction, wind turbulence per height, wind angle (overall), wind angle per direction, and wind angle per height from the ground.

The Wind Power is equal to the air density multiplied by the cube of the wind velocity. The Wind Energy is the Wind Power accumulated over time.

Initial Local Wind Density refers to the measured and/or potential Wind Energy for a selected potential wind turbine support structure location corresponding to the metrics of at least two variables that may be measured at the same zone.

Dynamic Local Wind Density refers to the measured and/or potential wind energy for a selected potential wind turbine support structure location corresponding to the metrics of at least two variables and at least one measurement is at a zone different than the other measurements. The zone differential corresponds to at least height. Height corresponds to elevation from a reference point that may be from ground level, sea level or any selected point of reference.

Overall Initial Wind Density refers to the combined data of at least two Initial Local Wind Density measurements each taken at a separate location.

Overall Dynamic Wind Density refers to the combined data of at least two Dynamic Local Wind Density measurements each taken at a separate location.

FIG. 1A is a simplified cut-away view showing an exemplary implementation of a wind power system 100. The wind power system 100 includes VAWT or HAWT 102 affixed to a support tower 104. Hereinafter, the HAWT and the VAWT are referred to interchangeably as the wind turbine 102, unless otherwise noted. Use of the term support tower is not intended to be a limitation, and may include a conical, cylindrical, chimney, multisided, multipart, tubular structure, having openings, closed walls, solid walls, and flexible and/or stiff walls. In one implementation, shown in FIG. 1A, the support tower 104 provides a support platform 106 to support the wind turbine 102 positioned on the support platform 106. The support tower 104 may be made to any suitable height dimension that places the wind turbine 102 in an optimal position for receiving a suitable wind current and that minimizes ground effects on the wind current. For example, the height of the support tower 104 may be between about 50 meters and 100 meters, and preferably, between about 60 meters and 90 meters.

In one implementation, the support tower 104 includes an at least partially hollow enclosure 108 formed below the support platform 106, which defines a space 110. The enclosure 108 may be formed by any conventional means, such that the enclosure 108 may be made capable of being sealed closed to maintain a positive or negative air pressure. The internal environment of the enclosure 108 may be capable of being environmentally controlled. For example, the enclosure may be formed as a cylindrical tank that includes an access hatch or door that is configured to maintain a seal when closed. The walls of the cylindrical tank may be insulated so that the internal temperature of the tank may be controlled.

In one implementation, the enclosed space 110 provides a location for positioning an electrical power generation system 112. In addition to providing a support structure for optimally positioning the wind turbine 102, the support tower 104 with enclosure 108 provides for the protection of the power generation system 112 from debris and adverse weather or temperature conditions. Moreover, as described below, the environmentally controlled enclosure 108 may provide a means by which to optimize performance of the electrical power generation system 112.

Figure 1B:
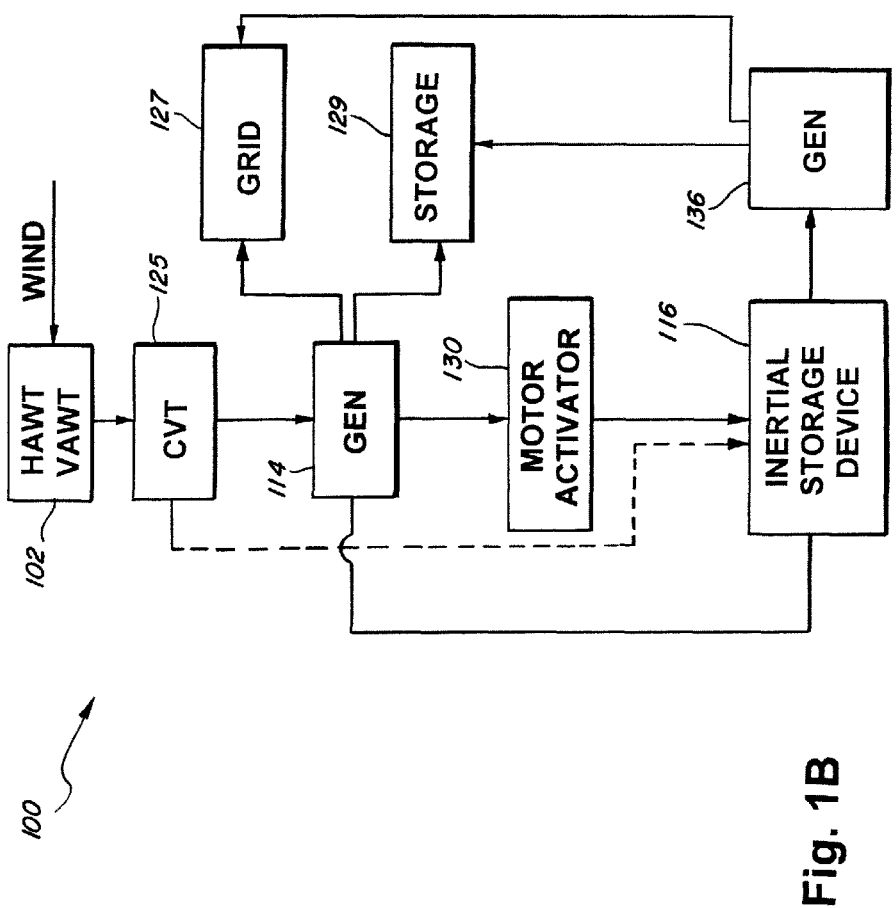
FIG. 1B is a flow diagram of an exemplary implementation of the wind power system of FIG. 1A.

As shown in FIGS. 1A and 1B, in one implementation, the electrical power generation system 112 includes at least one power generator 114 and an inertial storage device 116, along with additional support structures provided for securing the components of the power generation system 112 to the support tower 104 within the enclosure 108. Although a single generator 114 is shown in FIGS. 1A and 1B, this is not to be taken as a limitation and it should be understood that multiple generators 114 may be used in some implementations.

In some exemplary implementations the entire support tower 104 or at least a portion of the enclosure 108, which houses the inertial storage device 116, may be sealable and kept at a different pressure from at least one of the rest of the support tower enclosure 108 and the external environment. The pressure differential may be a higher or a lower pressure and may include a vacuum. In some aspects, since the enclosure 108 of the support tower 104 may be insulated, pressurized, heated, cooled and the like, the nominal internal environment of the support tower enclosure 108 may be controlled to subsequently impact the performance of the generator 114, the inertial storage device 116, or both.

Referring again to FIG. 1A, the at least one generator 114 may be mounted to support tower 104 via support structures 117, such that a shaft or axle 119 may be coupled between the generator 114 and the wind turbine 102. The shaft 119 is configured to translate the wind energy captured by the wind turbine 102 and direct the mechanical energy thus created into the generator 114.

As shown in FIGS. 1A and 1B, in one implementation, the wind turbine 102 may be coupled to the generator 114 via a continuously variable transmission (CVT) 125. The CVT 125 is a transmission that can smoothly step through an infinite number of effective gear ratios between maximum and minimum values. The CVT 125 allows the drive shaft 119 to maintain a constant angular velocity over a range of output velocities. This enables the generator 114 to perform at its most efficient revolutions per minute (rpm) for a range of speeds. The stable angular velocity on the draft shaft 119 allows for the maximum use of the mechanical energy available for conversion into electrical energy. In one example, the CVT 125 may take the form of a power transmitting device having hydraulically actuated friction plates capable of being variably clamped, and having hydraulic means for measuring the delivered torque and accordingly varying the clamp up force to maintain a constant output torque. One such exemplary CVT is described in U.S. Pat. No. 3,420,344, which is herein incorporated by reference for all purposes.

In another example, the CVT 125 may take the form of an electrically-compensated constant speed drive that includes a power converter, which accomplishes the transfer of power between permanent magnet machines. One such exemplary CVT is described in U.S. Pat. No. 4,695,776, which is herein incorporated by reference for all purposes.

In some operational implementations, the generator 114 generates electricity from the mechanical energy provided by the wind turbine 102 that is then provided to the electrical power grid 127 or an electrical storage device 129 (FIG. 1B).

In some operational implementations, the inertial storage device 116 is coupled to the at least one generator 114 via at least one of a clutch, transmission and/or hub arrangement 120 and shaft or axle 122. The at least one of a clutch, transmission and/or hub arrangement 120 may also be connected to a controller (not shown) to selectively or automatically engaged and disengage the inertial storage device 116 from the generator 114 as desired.

The inertial storage device 116 may be any suitable inertial storage device, however, in one example, the inertial storage device 116 is a flywheel energy system (FES) device 116. The FES device 116 includes a rotor or flywheel 128 and at least one activator motor 130 used to accelerate or decelerate the flywheel 128. The flywheel 128 may be mounted on a low friction base 132 including low friction bearings to reduce loss of energy caused by friction created while spinning. In some exemplary implementations, the flywheel 128 of the FES device 116 may be made of high strength steel or similar material made to rotate on mechanical bearings. In other exemplary implementations, the flywheel 128 may be made of carbon filaments or other similar material, suspended by magnetic bearings. It should be understood that the above examples are not limiting, and the wind power systems described herein may be used with any appropriate known or yet to be developed FES system.

In one implementation, the FES device 116 may be suspended by bearings in the enclosed space 110 of the enclosure 108. Accordingly, since the enclosure 108 may be capable of maintaining a negative air pressure, the flywheel 128 may operate in the negative air pressure and under other environmentally controlled conditions to further reduce the effects of friction and to otherwise increase the efficiency of the operational components of the FES device 116.

In operation, the FES device 116 stores energy by accelerating the flywheel to a very high speed and maintaining the energy in the device as rotational energy. When energy is extracted from the FES device 116, as a consequence of the principle of conservation of energy, the flywheel's rotational speed is reduced. Conversely, adding energy to the FES device 116 correspondingly results in an increase in the rotational speed of the flywheel 128. In one implementation, the electricity created by the generator 114 is supplied via electrical wiring 134 to power activator motors 130. The activator motors 130 are used to accelerate and decelerate the flywheel 128 to increase or decrease the rotational speed.

In one implementation, a circumferential generator 136 may be positioned adjacent the flywheel 128 within the enclosure 108 to be selectively engaged and disengaged with the FES device 116. The circumferential generator 136 is a power generator having a rotating element that can be connected to the outer surface of the FES device 116 to generate power as the flywheel 128 is made to spin. The circumferential generator 136 may be used to generate electricity that is provided to the electrical grid 127 or the storage device 129, such as a battery or a capacitor.

Figure 2A:
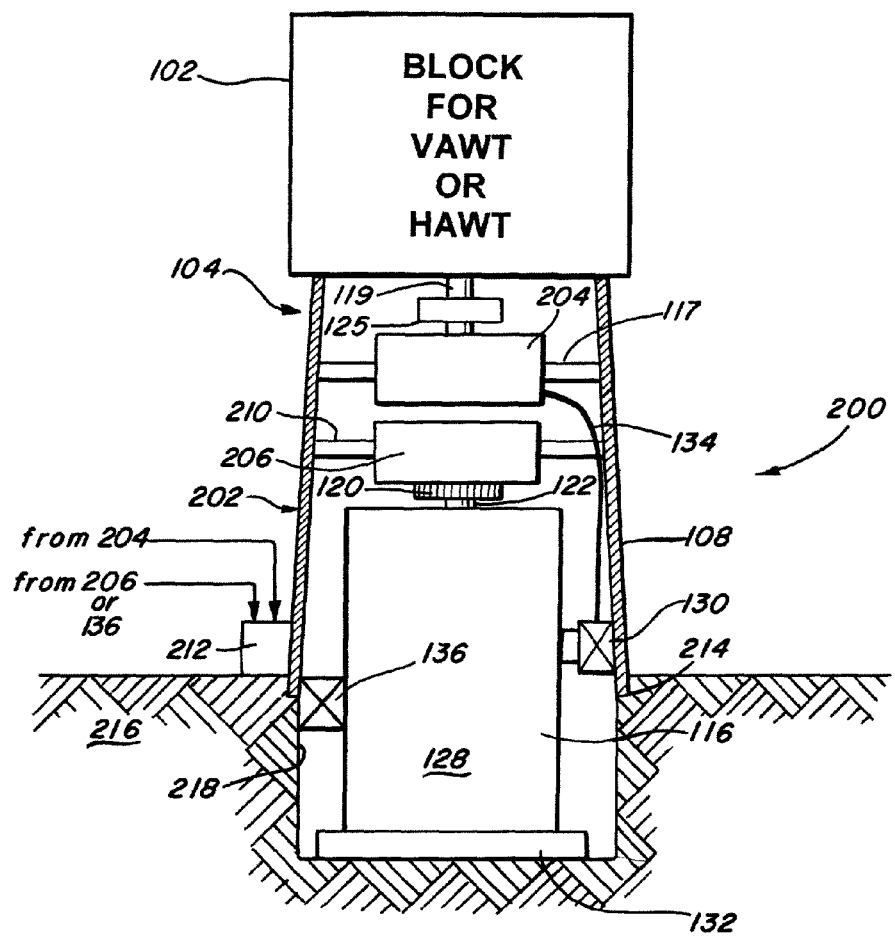
FIG. 2A is a simplified cut-away view of an exemplary implementation of a wind power system.

FIG. 2A is a simplified cut-away view showing an exemplary implementation of a wind power system 200. Wind power system 200 is generally configured to operate as described above regarding wind power system 100, however with the exceptions and alternatives described below. The wind power system 200 includes the wind turbine 102 affixed to the support tower 104, which includes the support platform 106 used to support the wind turbine 102 positioned on the top of the support platform 106.

In one implementation, the support tower 104 includes the at least partially hollow enclosure 108, which defines the enclosed space 110. In this implementation, the enclosed space 110 provides an enclosure for an electrical power generation system 202.

Figure 2B:
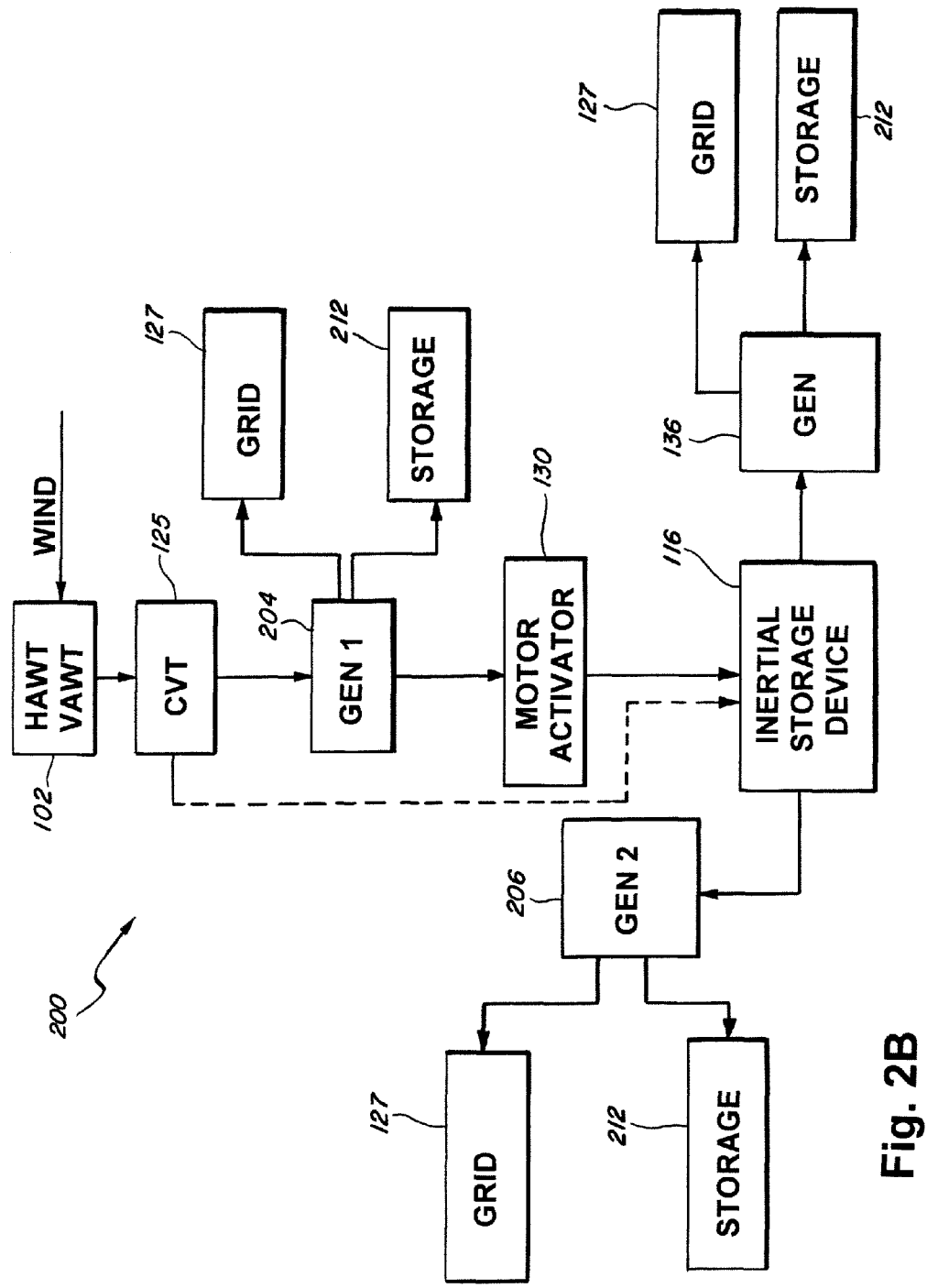
FIG. 2B is a flow diagram of an exemplary implementation of the wind power system of FIG. 2A.

As shown in FIGS. 2A and 2B, in one implementation, the power generation system 202 includes multiple generators, including at least a first generator 204, a second generator 206 and the inertial storage device 116, along with additional support structures provided for securing the components of the power generation system 202 to the support tower 104 within the enclosure 108.

In some exemplary implementations the entire support tower 104 or at least a portion of the enclosure 108, which houses the inertial storage device 116, may be sealed and kept at a different pressure from at least one of the rest of the support tower enclosure and the external environment. The pressure differential may be a higher or a lower pressure and may include a vacuum. In some aspects, the enclosure 108 of the support tower 104 may be insulated, pressurized, heated, cooled and the like to have some impact on the nominal internal environment of the support tower enclosure, and subsequently impact the performance of the first generator 204, the second generator 206, the inertial storage device 116, or a combination of all three.

Referring again to FIG. 2A, the first generator 204 is mounted to support tower 104 via support structures 117, such that a drive shaft or axle 119 may be coupled between the first generator 204 and the wind turbine 102. The drive shaft 119 is configured to translate the wind energy captured by the wind turbine 102 and direct the mechanical energy thus created into the first generator 204. In one implementation, the wind turbine 102 may be coupled to the first generator 204 via the CVT 125 in the manner described above regarding wind power system 100.

The wind turbine 102 via the first generator 204 can generate electricity that is provided to the electrical grid 127, or a storage device 212, such as a battery or capacitor. In one implementation, the first generator 204 generates electricity from the mechanical energy provided by the wind turbine 102 that is then transmitted on lines 134 to power at least one activator motor 130 used to rotate the inertial storage device 116.

As shown in FIG. 2A, in one exemplary implementation, the second generator 206 is firmly affixed to the support tower 104 adjacent the first generator 204 using support structures 210. In this implementation, the inertial storage device 116 is coupled to the second generator 206 via at least one of a clutch, transmission and/or hub arrangement 120 and shaft or axle 122. The at least one of a clutch, transmission and/or hub arrangement 120 may also be connected to a controller (not shown) to selectively or automatically engaged and disengage the inertial storage device 116 from the second generator 206 as desired.

As previously described, in one implementation, the inertial storage device 116 may be the FES device 116 suspended by bearings inside the vacuum or otherwise environmentally controlled enclosure 108. Excess energy from first generator 204 may be used to drive the at least one activator motor 130 attached to the inertial storage device 116, which becomes stored energy in the flywheel 128. As shown in FIG. 2B, the stored energy can then be used to drive the second generator 206 and subsequently placed into the grid 127 or stored.

The circumferential generator 136 that may be positioned adjacent the flywheel 128 within the enclosure 108 is to be selectively engaged and disengaged with the FES device 116 to generate electricity that is provided to the grid 127 or the storage device 212.

As also shown in FIG. 2A, to further provide support and/or environmental control regarding temperature, debris and the like and to limit the external footprint of the wind power system 200, at least a portion 214 of the support tower 104 may be located below a surface 216. The surface 216 may be the surface of the ground upon which the support tower 104 is constructed or it may refer to below the surface of a building or other structure upon which the support tower 104 may be constructed. In other implementations, the enclosure 108, including the inertial storage device 116, may be partially or completely placed below the surface 216. For example, a well 218 may be formed immediately below the support tower 104, which is sized and shaped to receive at least a portion of the enclosure 108 and the inertial storage device 116 therein.

Referring again to FIGS. 1B and 2B, the figures illustrate an alternative implementation of the wind power systems 100 and 200 in which the CVT 125 may perform as a "dual" CVT. In this implementation, the mechanical energy generated by the wind turbines 102 may be coupled through the dual CVT 125 directly to the generator 114 (FIG. 1B) or the first generator 204 (FIG. 2B) as described above, or the dual CVT 125 may be coupled directly to the inertial storage device 116 (dashed line), thus bypassing activator motor 130. In this implementation, the dual CVT 125 may operate as previously described however, the rotor shaft delivering the mechanical energy from the wind turbine 102, may be attached to two gearboxes and simply "shifted" between the two gearboxes with a clutch. The clutch moves the rotor shaft from one set of gears coupled to one gearbox and subsequently the generators, to another set of gears coupled to the other gearbox and subsequently to the inertial storage device 116.

When confronted with high winds or high velocity gusts of wind, a typical wind turbine must be protected for fear of the components of the wind turbine being damaged. The concern is that as the wind creates a load or force that impinges on the rotor blades of the wind turbine, the blades tend to bend, such that a torque is created at or near the mechanical transmission components of the wind turbine. If the blades are made to bend beyond a certain limit, the wind turbine may be damaged.

Figure 3:
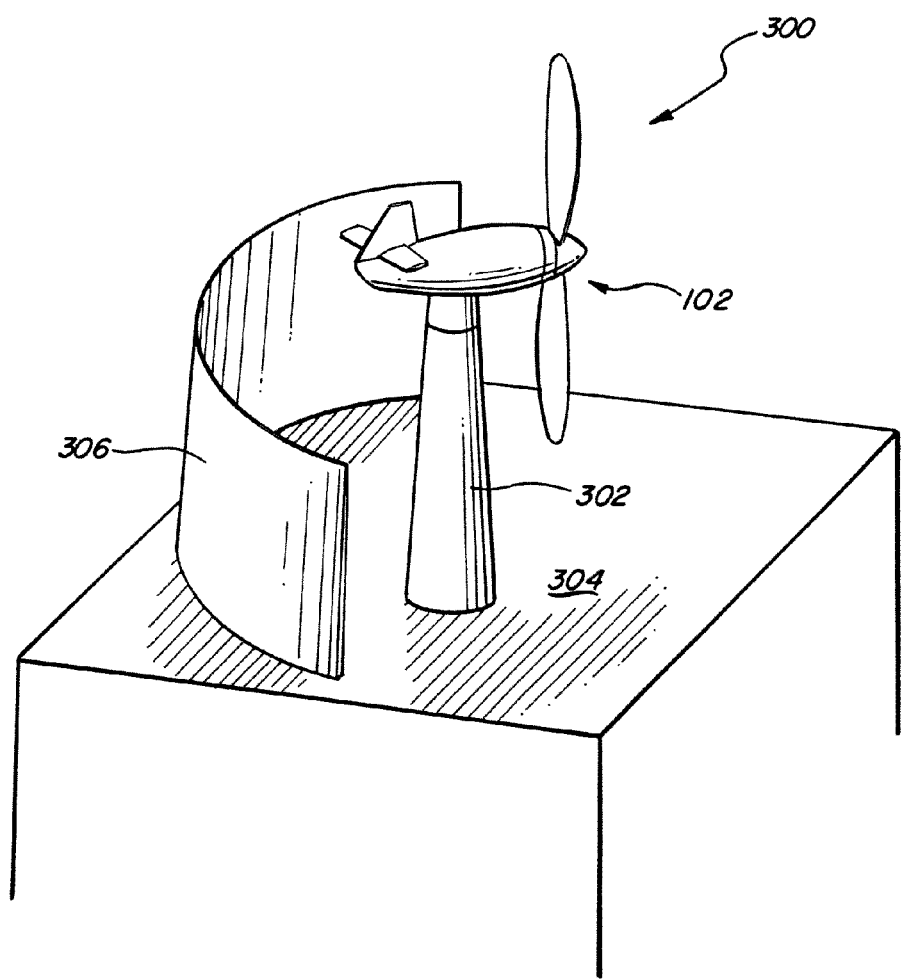
FIG. 3 is a simplified perspective view of an exemplary implementation of a wind power system.

FIG. 3 is a simplified illustration of an exemplary implementation of a wind power system 300 that reduces the wind speed near the energy developing rotor subsystem by providing a movable and relocatable physical barrier relative to the wind flow direction. The physical barrier can be configured to control the air movement and redirect part of the wind away from the rotor blades of the rotor subsystem to reduce "loads" on the components of the system while maintaining the air flow in the maximum operating power production range (at rated output) of the generator subsystem. The physical barrier also acts to reduce loads created by "wind gusts" (intermittent rapid changes in the free wind velocity) and therefore the associated "impact loads" that are caused by the variability in wind force hitting the rotor blades of the rotor subsystem.

In one implementation, the wind power system 300 includes a wind turbine 102 affixed to a support tower 302. The support tower 302 may include a conical, cylindrical, chimney, multisided, multipart, tubular structure, having openings, closed walls, solid walls, and flexible and/or stiff walls. In one implementation, shown in FIG. 3, the support tower 302 is mounted or constructed upon a support structure 304 to support the wind turbine 102 positioned thereon. The support tower 302 may be made to any suitable height dimension, which places the wind turbine 102 in an optimal position for receiving a suitable wind current and which minimizes ground effects. The support structure 304 may include the ground, the roof of a building, a parking structure or any other suitable support structure upon which the wind turbine 102 may be mounted or constructed.

In one implementation, the wind power system 300 includes a wind deflector 306 that is moveably positioned adjacent at least a portion of the support tower 302. As further described below, the wind deflector 306 may be moved and positioned relative to the wind turbine 102 so as to provide shielding for the wind turbine 102 in winds that may be streaming or gusting, at speeds that may be beyond the operating capacity of the wind turbine components.

In one implementation, the wind deflector 306 may be a wall-like structure made to completely surround or partially surround at least a portion of the wind turbine, and capable of shielding, blocking, deflecting, redirecting, reflecting or otherwise controlling, the movement of wind currents. The wind deflector 306 may be a solid, a mesh, or a multi-part deflector. The wind deflector 306 may be formed into any suitable geometric shape depending, on the specific implementation. For example, the wind deflector 306 may be a flat structure that is positioned perpendicular to the wind direction, a multifaceted structure that includes multiple flat surfaces positioned at various angles to the wind direction, or a curved structure as shown in FIG. 3, that may have a circular, parabolic, hyperbolic, elliptical or similarly curved geometry. In some implementations, the geometry of the wind deflector 306 may include a combination of the geometries thus described. The cross-section of the wind deflector 306 may also vary depending on the implementation. For example, the cross section may appear rectangular, or may be tapered to be wider towards the base of the wind deflector to provide increased resistance to the wind loads that the deflector may experience.

The wind deflector 306 may be made of a variety of individual materials or a combination of materials, each of which is capable of providing adequate structural support to withstand the various wind loads that may be experienced by the wind deflector 306. For example, the wind deflector 306 may be a metal, a polymer, a composite material, such as carbon, fiberglass, and fiberglass reinforced plastic, or any combination of these materials.

Figure 4:
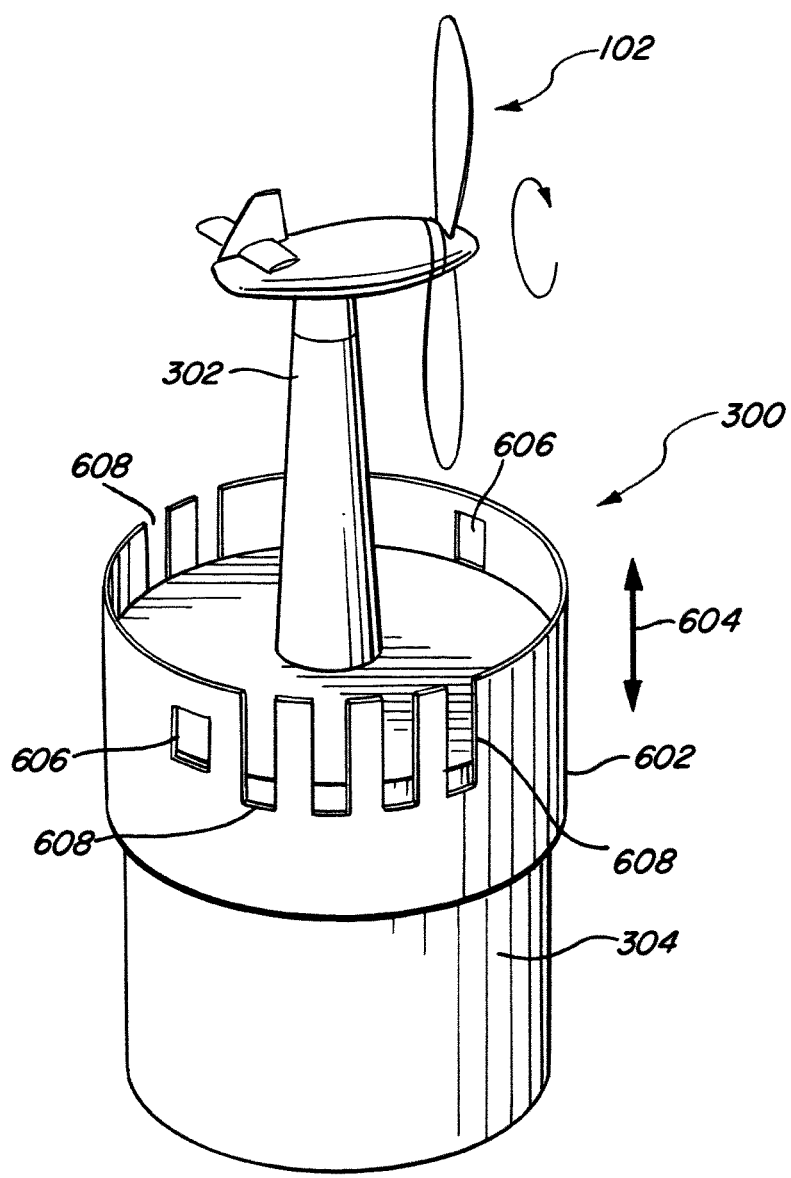
FIG. 4 is a perspective view an exemplary implementation of a wind power system.

FIG. 4 is a simplified illustration showing yet another alternative implantation for deploying the wind deflector. In this implementation, the wind turbine 102 is mounted firmly to the support tower 302, which is mounted on the support structure 304. A wind deflector 602 is moveably coupled to the support structure 304 such that the wind deflector 602 is movable around at least a portion of the support tower 302. The wind deflector 602 may also be moved up and down relative to the wind turbine 102 as indicated by arrow 604 to reduce or increase the ability of the wind deflector to control the movement of the air currents. In one alternative implementation, the wind deflector 602 may be configured to completely surround the wind turbine 102, such that when deployed the wind deflector 602 can simultaneously deflect wind coming from any direction relative to the wind turbine 102. In some implementations, the wind deflector 602 may include one to a plurality of apertures 606, one to a plurality of slits 608 or some combination of both, formed or cut into the wind deflector 602. The apertures 606 and slits 608 are provided to allow at least some wind to pass though the wind deflector 602 when deployed to increase the ability of the wind deflector 602 to capture the wind and deflect the wind back toward the wind turbine 102.

Figure 5:
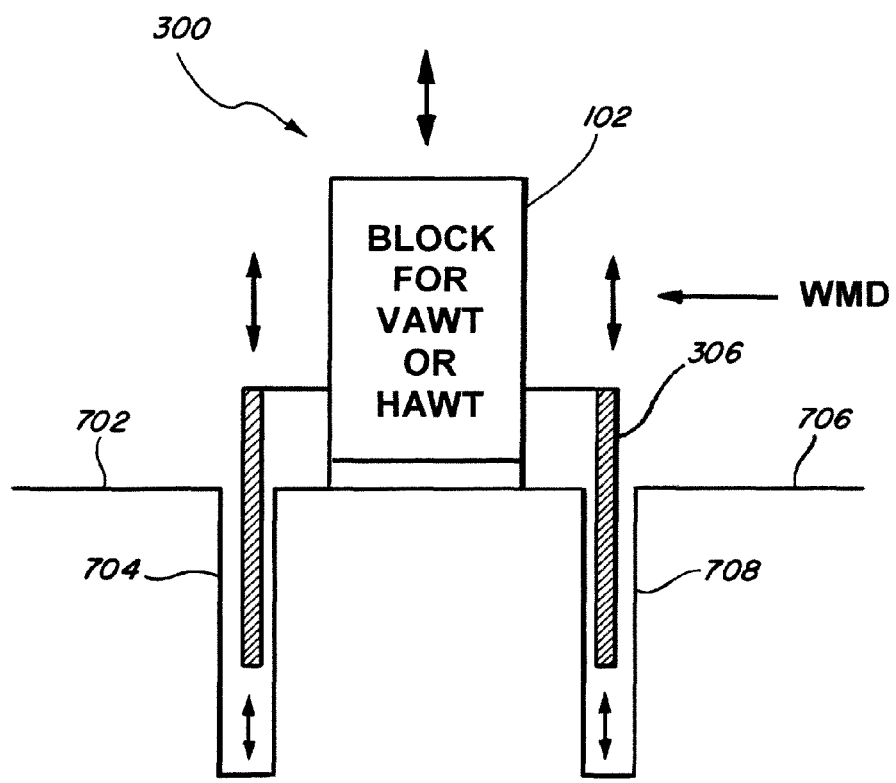
FIG. 5 is a cut away view of an exemplary implementation of a wind power system.

Referring now to FIG. 5, in one implementation, the wind deflector 306 may be deployed from below the planar support surface 304 upon which the wind turbine 102 is constructed. As shown in FIG. 5, in this implementation, the wind turbine 102 is fixed at our near ground level, or at or near a relatively large planar surface raised above ground level (e.g. a rooftop, building top or parking structure). In some instances, the wind turbine 102 is not necessarily mounted on the support tower 302, since when mounted on a rooftop, building top or parking structure, the wind turbine 102 is already raised-up relative to the ground level 702. In such instances, the wind deflector 306 may be lowered below the ground level 702 into a guide 704 or alternatively, below the large planar surface raised above ground level 706 into a guide 708.

Figure 6:
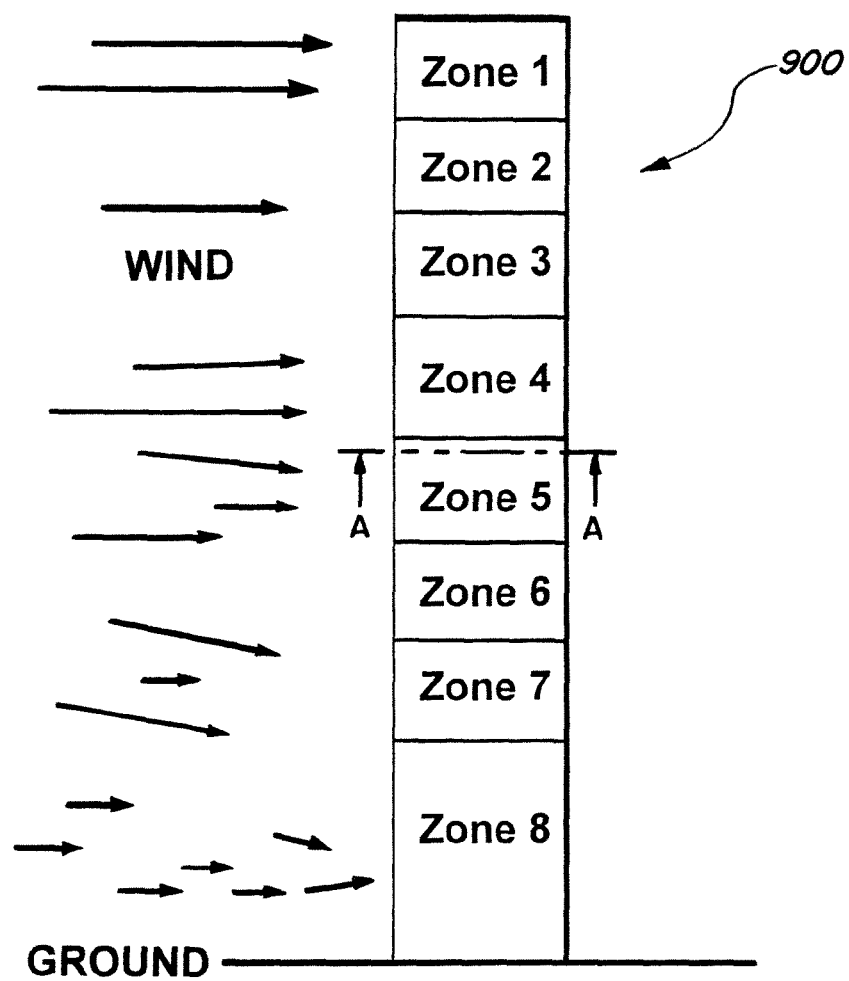
FIG. 6 is a diagram of a wind metric array.
Figure 7:
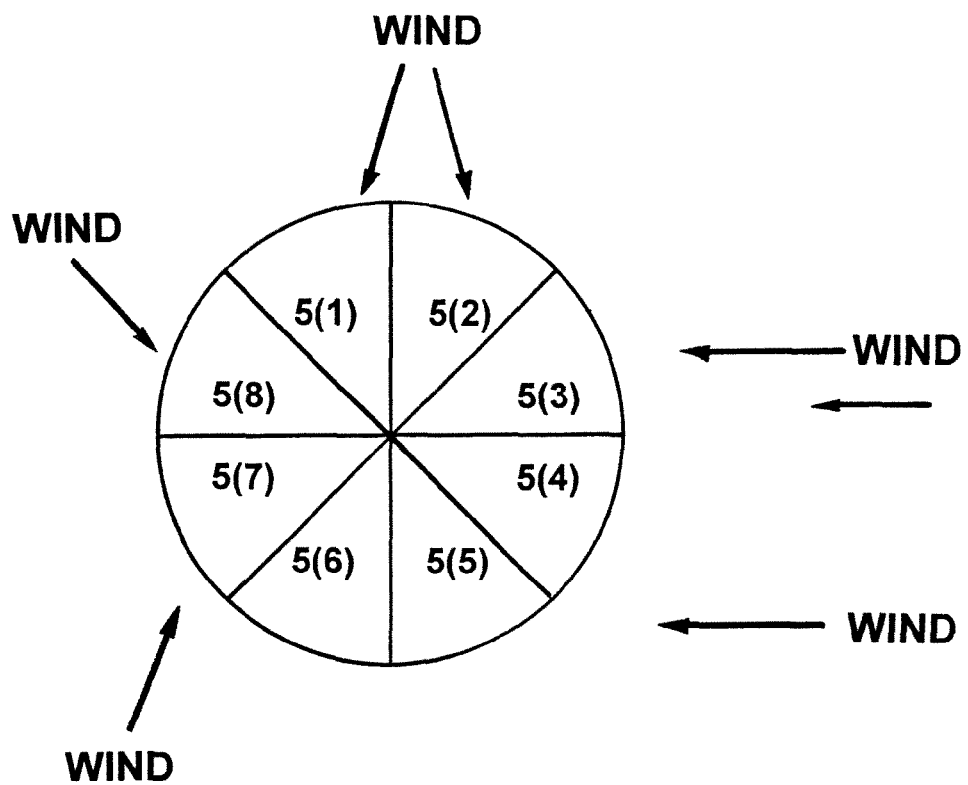
FIG. 7 is a representation of a section at line A-A of the wind metric array of FIG. 6.

FIGS. 6 and 7 provide a schematic representation of a method for determining a wind metric. In one implementation, an array of sensors 900 is provided. Each sensor in the array of sensors 900 is placed in a zone that represents a discrete height range from the ground. For example, zone 3 may be between a height of 50 meters and 60 meters, while zone 4 may be between a height of 60 meters and 70 meters. The array of sensors 900 is provided in a stacked arrangement, such that at least one sensor from the array of sensors 900 is positioned at a height to measure wind metrics within the corresponding zone 1-8. The array of sensors 900 is used to measure at least one of wind temperature, wind speed, wind angle, wind direction, duration of a gust, wind velocity, wind acceleration and the like in the corresponding zone 1-8, in which the sensor is positioned. FIG. 7 illustrates that within each zone 1-8 are sub-zones that can more narrowly measure the wind direction of the ambient wind. The arrows used in the figures to indicate wind, vary in weight to indicate different wind intensities, length to indicate different durations and angle to indicate different direction of travel. From data collected by the array of sensors 900, a wind metric for a geographical location may be created for a date/time interval. Wind metric data is then used to optimize the capture of available wind energy by matching the appropriate blade and turbine configuration with the wind metric at the height (zone) and location of the wind turbine. Matching includes but is not limited to selecting at least two wind turbine/blade configurations, each to be placed in a tower support at different heights (zones) each of which operates substantially within the range of at least one measure wind profiling elements such as speed, wind angle, wind direction, duration of gusts, wind velocity, and wind acceleration. Through wind density data it is possible to match turbine type, size, blades and the like with geographic locations where tower heights may be lowered while achieving the same or more potential wind energy harvesting capability as traditional high tower HAWT configurations.

Figure 8:
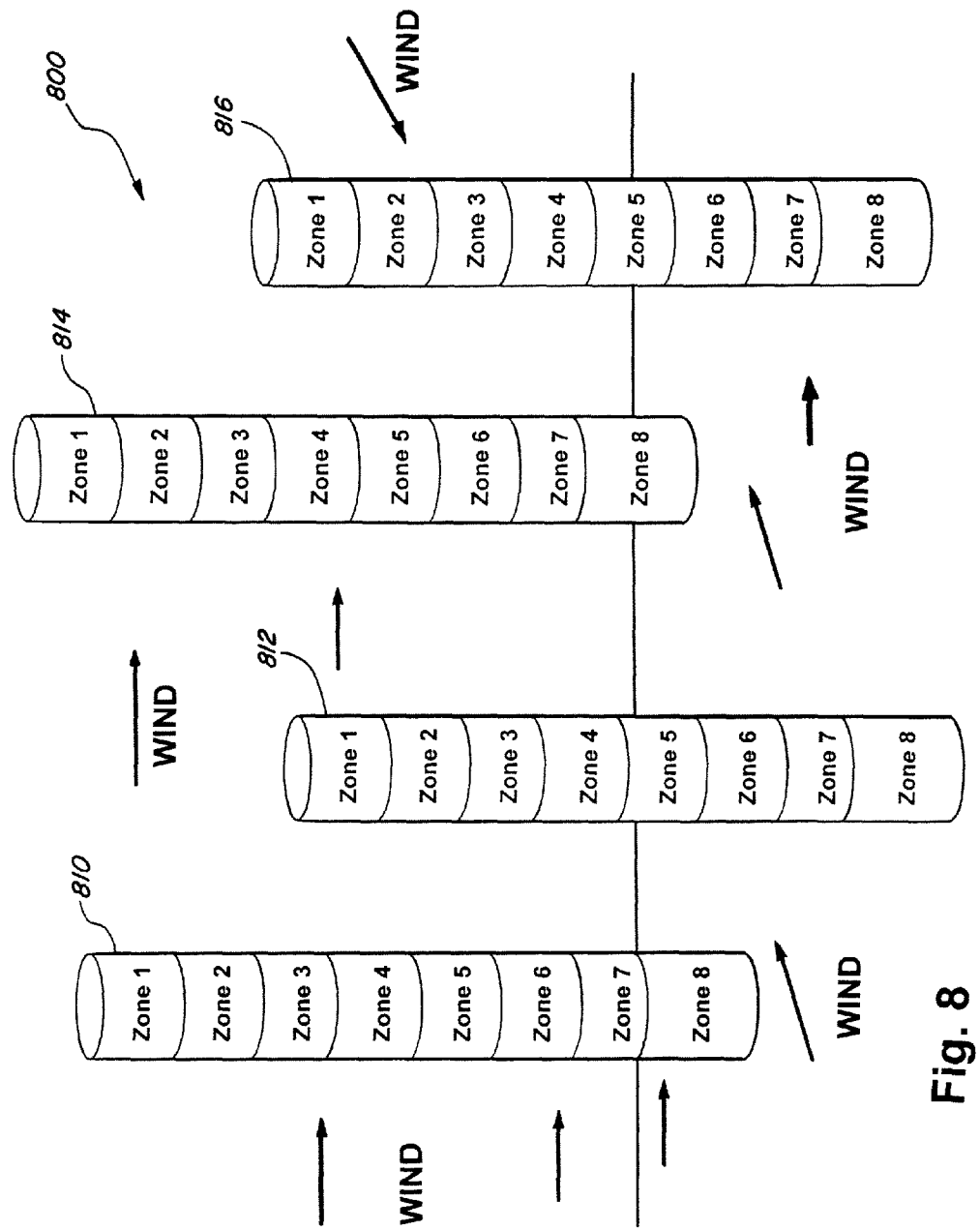
FIG. 8 is a representation of local and overall wind energy metric mapping to determine initial wind density and dynamic wind density.

FIG. 8 represents a method for local and overall wind energy metric mapping to determine initial wind density and dynamic wind density. Each measured primary location 810, 812, 814 and 816 represents a volumetric local region having a particular height and width. Within each volumetric region are zones, similar to zones 1-8 described above. Two or more metric data measurements from a volumetric region may be used to determine an initial wind density for the local primary location. If at least one measurement is at a zone different than the other measurements, which includes height, then the determination is of the local dynamic wind density. From this data, the overall initial wind density may be determined for the geographic region including the local primary locations from which the metric date is supplied. From such data when a differential of height is present (i.e. at least one measurement is at a zone different from the others) then the overall dynamic wind density for the geographic region including each of the primary locations from which the metric data is supplied is determined. The sensor data is then processed to generate a map of the wind characteristics at the location or region corresponding to at least the time and date of the measurement.

Predictive modeling is supported by the use of wind energy metric mapping analyzed with a predictive algorithm to forecast the future wind energy that should be available at a mapped location based on identified assumptions. Expressly incorporated by reference as if fully set forth herein: US Patent Application 20080270071 entitled "NONPARAMET- RIC METHOD FOR DETERMINATION OF ANOMALOUS EVENT STATES IN COMPLEX SYSTEMS EXHIBITING NON-STATIONARITY".

All callouts and written information on or associated with the figures is hereby incorporated by this reference. Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A wind power system comprising:
   a wind turbine mounted on a tower support structure, the tower support structure including an enclosure;
   a continuously variable transmission (CVT) coupled between the wind turbine and a first generator; and
   an inertial storage device including a rotational element positioned in the enclosure, the inertial storage device configured to receive and store energy from the first generator by causing the rotational element to accelerate its rotation.

2. The system of claim 1, wherein the wind turbine comprises one of a horizontal axis wind turbine (HAWT) and a vertical axis wind turbine (VAWT).

3. The system of claim 1, wherein the enclosure comprises an enclosure capable of maintaining a negative air pressure.

4. The system of claim 1, wherein the enclosure comprises an environmentally controlled enclosure.

5. The system of claim 1, further comprising at least one activator motor, the activator motor configured to receive the energy from the first generator to cause the inertial storage device to accelerate or decelerate.

6. The system of claim 1, further comprising a circumferential generator positioned adjacent the inertial storage device, the circumferential generator configured to convert energy stored in the inertial storage to electrical energy.

7. The system of claim 1, further comprising a second generator coupled to the inertial storage device, the second generator converting kinetic energy stored in the inertial storage device into electrical energy.

8. The system of claim 1, wherein the inertial storage device comprises a flywheel energy system, the flywheel energy system including a flywheel and at least one activator motor, wherein the activator motor causes the flywheel to accelerate or decelerate.

9. The system of claim 1, wherein the CVT is a dual CVT that is configured to be selectively coupled between the first generator and the wind turbine, and between the wind turbine and the inertial storage device.

10. A wind power system comprising:
    a wind turbine mounted for rotation on one of a horizontal axis and a vertical axis;
    a first generator configured to generate electricity in response to the rotation of the wind turbine;
    a continuously variable transmission (CVT) coupled between the wind turbine and the first generator;
    an activator motor configured to receive electrical energy from the first generator;
    an inertial storage device coupled to the activator motor and configured to store electrical energy received from the activator motor as kinetic energy; and
    a second generator coupled to the inertial storage device and configured to convert the kinetic energy stored in the inertial storage device into electrical energy.

11. The system of claim 10, wherein wind turbine is mounted on a support structure that includes an enclosure with controllable internal environment.

12. The system of claim 10, further comprising a circumferential generator positioned adjacent the inertial storage device and configured to convert the kinetic energy stored in the inertial storage to electrical energy.

13. The system of claim 10, wherein the inertial storage device comprises a flywheel coupled to the activator motor so as to cause the flywheel to accelerate its rotation in response to electrical energy received from the first generator.

14. The system of claim 10, wherein the CVT is a dual CVT configured to be selectively coupled between the first generator and the wind turbine, and between the wind turbine and the inertial storage device.

15. A wind power system comprising:
    a wind turbine mounted for rotation on one of a horizontal axis and a vertical axis;
    a generator configured to generate electrical energy in response to the rotation of the wind turbine;
    an inertial storage device configured to receive electrical energy from the generator and to store the electrical energy as kinetic energy; and
    a continuously variable transmission (CVT) configured to be selectively coupled between the wind turbine and the generator, and between the wind turbine and the inertial storage device.

16. The system of claim 15, wherein wind turbine is mounted on a support structure that includes an enclosure that provides a negative air pressure within the enclosure.

17. The system of claim 16, wherein the enclosure comprises an environmentally controlled enclosure.

18. The system of claim 15, wherein the inertial storage device comprises:
    a rotational element; and
    an activator motor coupled to the rotational element, and configured to receive electrical energy from the generator and to cause the rotational element to accelerate its rotation in response to the electrical energy received from the generator.

19. The system of claim 15, further comprising a circumferential generator positioned adjacent the inertial storage device and configured to convert the kinetic energy stored in the inertial storage to electrical energy.

20. The system of claim 15, further comprising a second generator coupled to the inertial storage device and configured to convert the kinetic energy stored in the inertial storage device into electrical energy.

21. The system of claim 18, wherein the rotational element comprises a flywheel.

* * * * *